United States Patent [19]

Chodil et al.

[11] 3,969,650
[45] July 13, 1976

[54] GAS DISCHARGE DISPLAY DEVICE AND A NOVEL HOLLOW CATHODE THEREFOR

[75] Inventors: Gerald Joseph Chodil, Highland Park; Michael C. DeJule, Chicago, both of Ill.; David Glaser, Greenbrook, N.J.

[73] Assignee: Zenith Radio Corporation, Chicago, Ill.

[22] Filed: Nov. 27, 1974

[21] Appl. No.: 527,569

[52] U.S. Cl. .......................... 315/169 TV; 313/188; 313/217
[51] Int. Cl.² ........................................ H05B 37/00
[58] Field of Search ........................... 313/188, 217; 315/169 TV

[56] References Cited
UNITED STATES PATENTS

| | | | |
|---|---|---|---|
| 3,704,386 | 11/1972 | Cola | 315/169 TV X |
| 3,742,483 | 6/1973 | Ogle | 315/169 TV X |
| 3,753,041 | 8/1973 | Lustig et al. | 315/169 TV |

*Primary Examiner*—R. V. Rolinec
*Assistant Examiner*—Lawrence J. Dahl

[57] ABSTRACT

A highly efficient, high current density gas discharge display panel having rows of columns of gas discharge cells. Each row and discharge cells communicates with a row of hollow cathodes formed of row-wise extending front and rear cathode means positioned adjacent and essentially parallel to each other. When a forward and rear cathode means are both energized, they operate together to form a row of hollow cathodes. With only the forward cathode means energized, a low current gas discharge exists in a row of cells, which discharge is transferred to the next adjacent row of cells by the application of scanning signals to the forward cathode means. A simplified unitary center sheet houses the cell enclosures and grooves for anode and cathode conductors to eliminate the need for multiple layers which require registration with one another. The novel structure permits a fast scan rate and efficient priming of the cells to avoid the necessity for high voltage video drivers.

29 Claims, 6 Drawing Figures

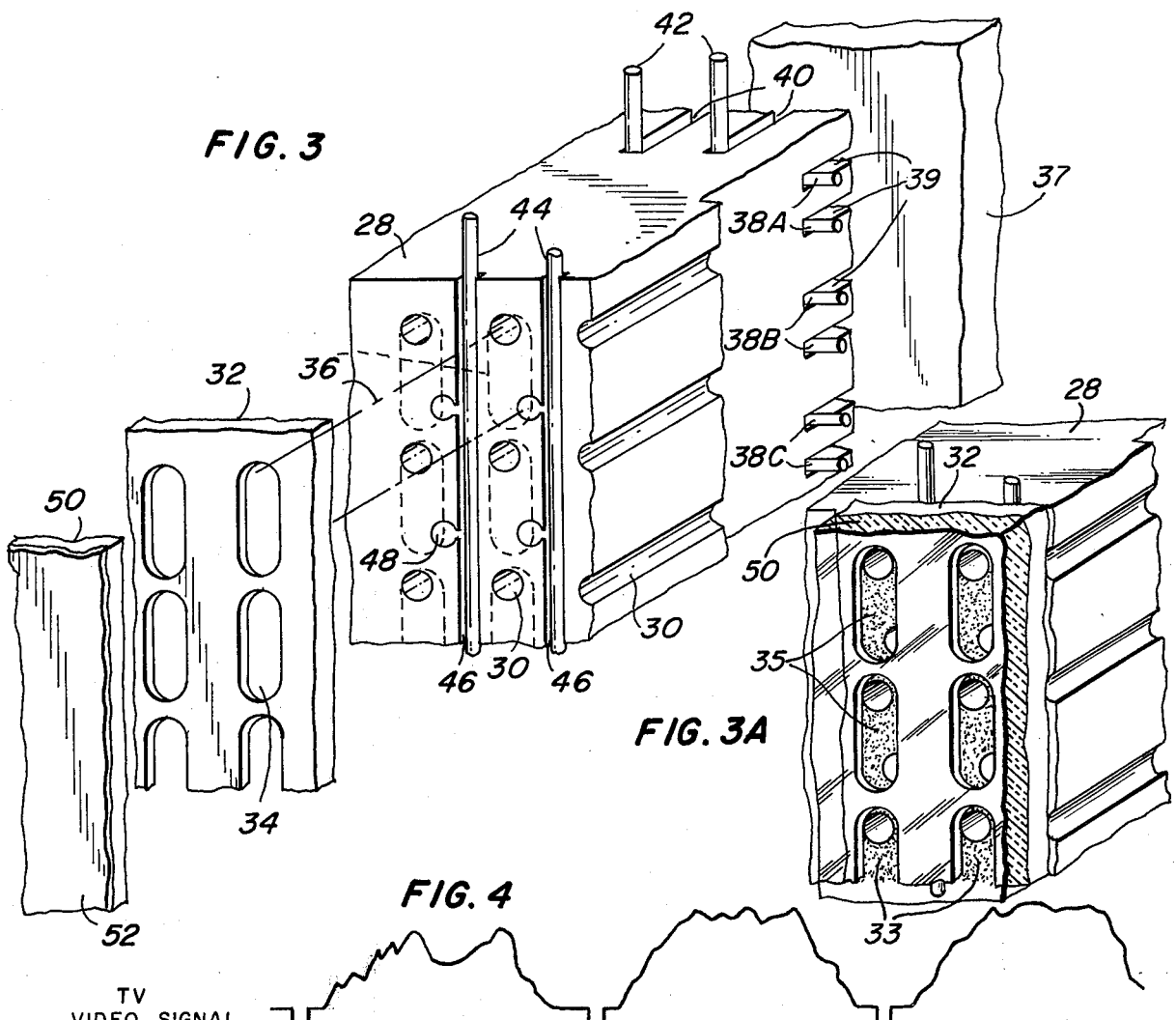
FIG. 3
FIG. 3A
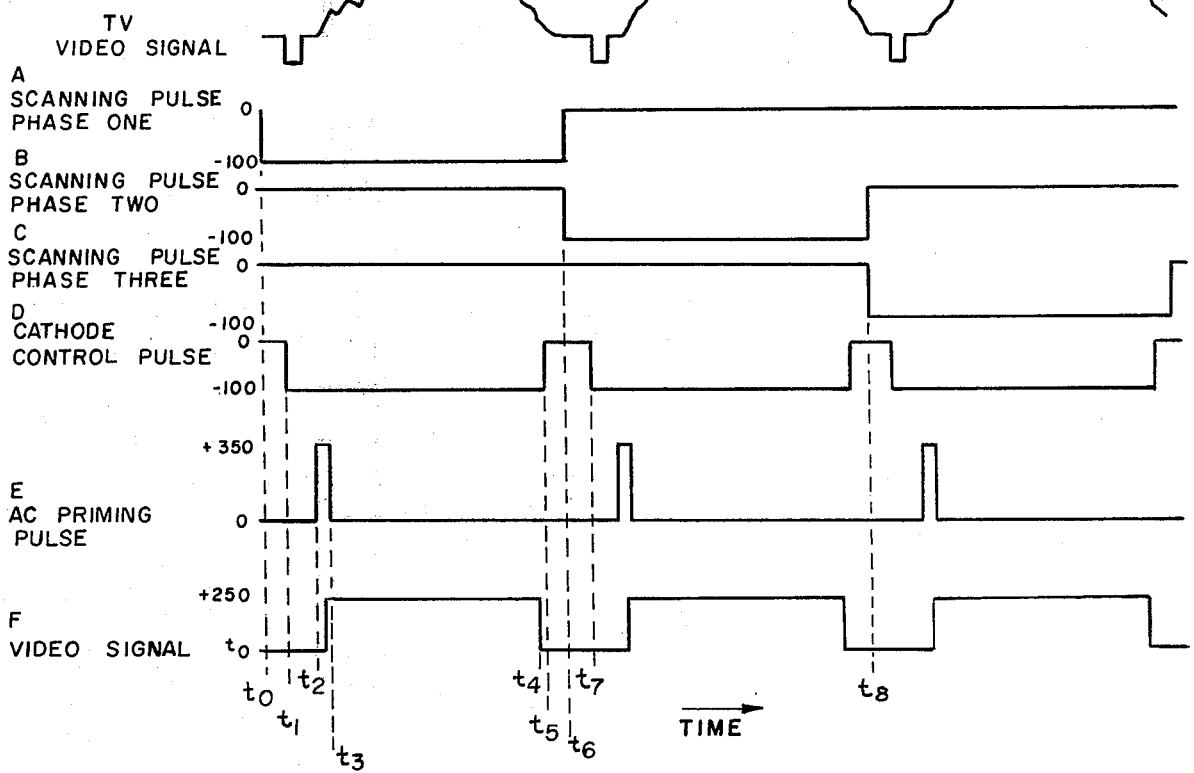
FIG. 4

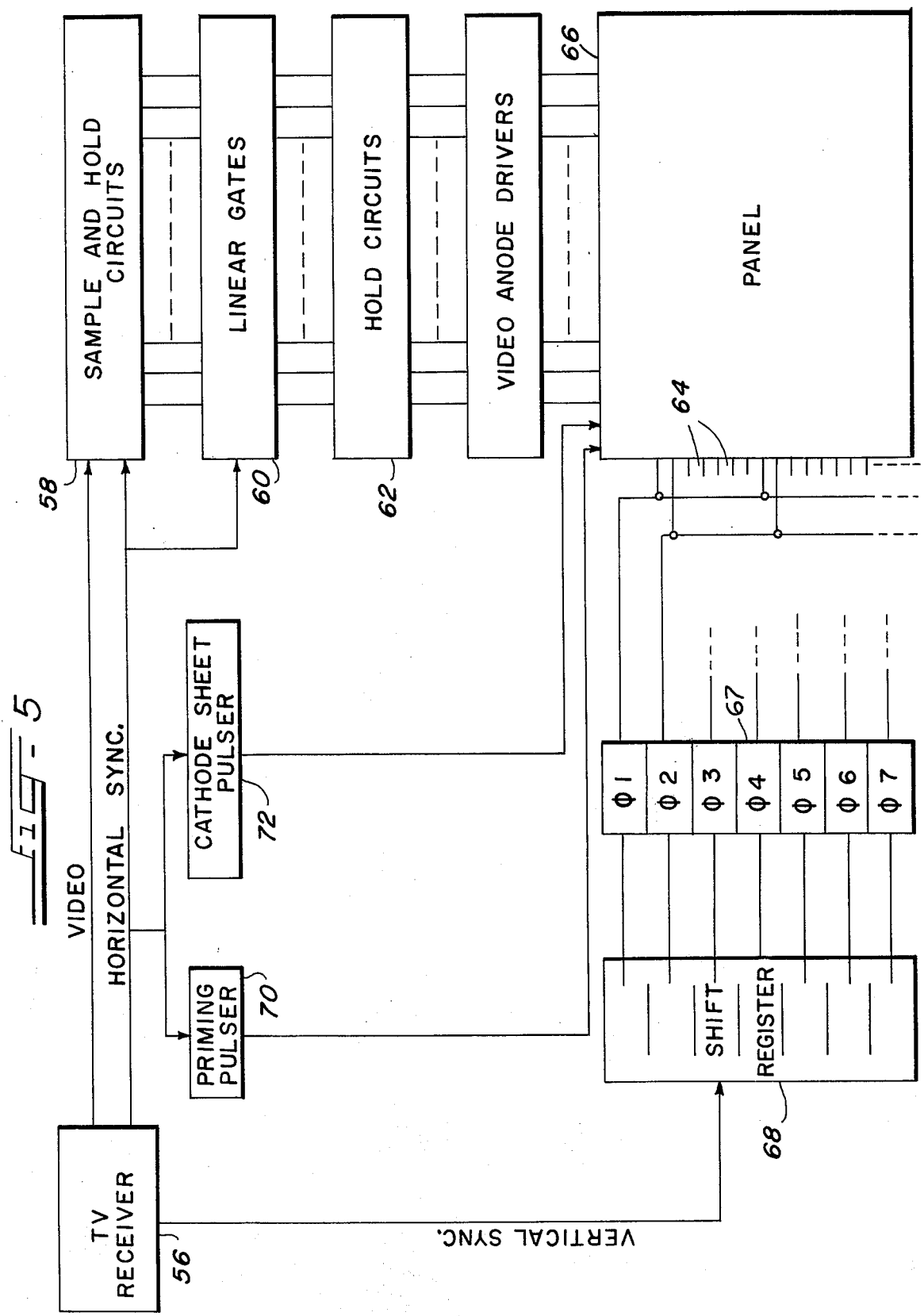

GAS DISCHARGE DISPLAY DEVICE AND A NOVEL HOLLOW CATHODE THEREFOR

CROSS REFERENCE TO RELATED APPLICATION

This application is related to co-pending application Ser. No. 527,568 filed Nov. 27, 1974; and application Ser. No. 436,294 filed Jan. 24, 1974 (now U.S. Pat. No. 3,899,636), both having common ownership herewith.

BACKGROUND OF THE INVENTION

This invention is related to visual display devices. It is particularly directed toward an improved gas discharge display for use in flat panel television, alpha-numeric displays and the like.

Gas discharge displays generally include a matrix of rows and columns of individual gas discharge cells. Typically, there are corresponding matrices and rows of columns of wire conductors which intersect at the individual cell locations. Each cell has at least an anode conductor and a cathode conductor between which a low pressure atmosphere of a gas, such as a noble gas and/or mercury vapor, is maintained. When a sufficient potential is applied between an anode conductor and a cathode conductor, a gas discharge is developed at the cell which is located at their intersection. A visible "cathode glow" is then established near the cathode and, in some applications, it is that glow which is used as the visible light output of the cell.

Between the anode conductor and the cathode glow a plasma or "positive column" exists which includes energetic electrons, excited atoms and ions. These particles are continuously recombining, regenerating and colliding. The collision of an energetic electron with a gas atom produces a high energy state in the atom's electron shell which decays to a lower energy state, thereby causing an emission of radiation from the atom and from the positive column. The gas constituents and the operating parameters of a cell may be chosen such that the radiation emanating from a positive column is in the UV (ultraviolet) spectrum. The UV radiation may then be converted into visible light of a predetermined color by directing the UV radiation onto a UV-excitable phosphor coated on one or more of the cell walls.

When excited by the UV radiation, the phosphor coating emits visible light of the predetermined color. It is with this mode of generating visible light from a gas discharge cell that this invention is primarily concerned, although certain aspects of it are also applicable to applications utilizing only the cathode glow as the source of light output, as well as to applications where light is produced by direct electron excitation of a phosphor.

In the past, gas discharge displays have suffered from a number of problems, one of which has been the high voltage required to drive the anode conductors to establish a discharge in selected cells. In typical commercial applications, anode conductors are driven with a potential of several hundred volts. Generally, the potential applied to such anode conductors is in the form of a time-varying signal which corresponds to video information, so that many high voltage video drivers are required to drive the individual anode conductors. In a television application, a typical gas discharge panel will have several hundred anode conductors, each driven by a video driver. To implement the circuitry required for such a system would be prohibitively expensive unless the circuitry could be realized in integrated circuit (IC) form. Since present IC technology is, for the most part, limited to the production of video circuitry capable of handling less than 150 volts, the video drivers can probably not be profitably integrated at this time. Instead, a discrete high voltage video driver is probably required for each anode conductor. A display incorporating discrete video drivers for each anode conductor would obviously be too expensive for consumer applications.

Another problem associated with prior art gas discharge displays is that, when it is desirable to draw a relatively high current through a cell in order to produce a high light output therefrom, the cathode of such cells often operate in the "abnormal mode" wherein the voltage across the cathode fall region increases. When a cathode is operating abnormally, the anode voltage of that cell must be increased in order to sustain a high current discharge therein. This increase in the anode voltage causes a concurrent increase in the power consumption of the cell and a resultant decrease in the operating efficiency of the cell; i.e., a decrease in the lumens output per watt input of the cell. In addition, the required increase in the anode voltage increases the possibility of spurious discharges occurring between the anode and other elements of the cell or adjacent cells, a highly undesirable condition.

The problem of operating a cathode in the abnormal region is aggravated when the cathode is used in a cell having a very low gas pressure. Although gas discharge cells operate more efficiently at such low pressures (see U.S. application Ser. No. 436,249, now U.S. Pat. No. 3,899,636 at least at low current levels, the cathode is more likely to go abnormal when higher cell currents are required. It is very desirable, therefore, to have an array of cells whose cathodes are capable of operating in low pressure atmospheres without going abnormal when they are required to deliver a relatively high level current.

An additional aspect of gas discharge display design with which this invention is concerned is the ability of the panel to scan sequentially and automatically from row to row in a way which is synchronized to a scanning video input signal such as a television signal. Without some sort of automatic scanning incorporated in the display, each cell would require that both its anode and its cathode be energized by separate anode and cathode drivers which can be sequentially switched from an "off" mode to an "on" mode. To provide each cell with separate switchable anode and cathode drivers would require undue circuit complexity and expense.

Although some gas discharge panels do feature a mode of automatic scanning for the cathode conductors, no such panel has been implemented in a way which provides both automatic scanning and cathodes capable of efficient high current density operation at low gas pressures.

A final problem which is common to many existing and proposed gas discharge display systems is the structural complexity of the panels themselves. In the commercial world where panels must be assembled in the hundreds or thousands, a requirement that multiple layers or sheets be stacked one on top of another in registration may be prohibitively expensive. A preferred panel has a minimum number of layers which must be aligned and has a system of conductors which easily mate with the various cell layers. In addition, a gas discharge display suitable for consumer applications should be easily fabricated in a number of viewing sizes.

Although all the above-mentioned problems are not found in every gas discharge panel, most suffer from one or more of them. A gas discharge panel, especially one intended for consumer use, should meet each such problem if it is to mature into commercial reality.

OBJECTS OF THE INVENTION

It is a general object of this invention to provide an improved gas discharge display panel.

It is a more specific object of this invention to provide a gas discharge panel having individual cells which operate efficiently in a high current density mode but which are also capable of being scanned automatically row by row.

It is another object of this invention to provide a gas discharge display which functions with low voltage video signals so that the video drivers therefore may be fabricated in integrated circuit form.

It is yet another object of this invention to provide a gas discharge display which is capable of being easily and quickly assembled.

PRIOR ART

The following references are related to gas discharge panels having hollow cathodes or automatically scannable rows of gas discharge cells: U.S. Pat. No. 3,662,214 and 3,701,918, Burroughs' Application Note, Bulletin No. S101, entitled "Self-Scan Panel Display Theory of Operation", and Burroughs' Application Note, entitled "Self-Scan Panel Display".

BRIEF DESCRIPTION OF THE DRAWINGS

The features of the invention which are believed to be novel are set forth with particularity in the appended claims. The invention, together with further objects and advantages thereof, may best be understood by reference to the following description taken in conjunction with the accompanying drawings in which:

FIG. 3 is an exploded view of a gas discharge panel constructed in accordance with this invention;

FIG. 3A is an assembled view of a section of FIG. 3 showing the formation of the display cavities;

FIG. 4 depicts a series of waveforms which illustrate typical control signals used to drive the FIG. 3 panel; and FIG. 5 is a schematic block diagram illustrating a gas discharge display system for displaying a television image on the gas discharge display panel of FIG. 3.

DESCRIPTION OF THE PREFERRED EMBODIMENT

It has been pointed out that an important aspect of this invention is providing a gas discharge cell which can operate at high current levels efficiently, particularly at low gas pressures. One type of cell which is known to provide efficient operation at low gas pressures uses what is referred to as a hollow cathode. An example of a hollow cathode is a hollow cylindrical structure whose inner walls act as a source of electrons. Since the walls of the hollow cathode "see" each other (surround the discharge), the generated metastables, ions, and UV photons easily impact the surrounding walls and generate new electrons. Examples of the use of such hollow cathodes in gas discharge displays may be found, for example, in U.S. Pat. Nos. 3,701,918, 3,662,214 and 3,882,342.

By way of definition, whenever the term hollow cathode is used hereinafter, it is meant to refer to any cathode structure which in operation provides a hollow cathode effect wherein a number of cathode surfaces "see" each other and induce the generation of a much greater number of electrons than are normally generated from a planar cathode.

In most gas discharge displays, one complete row of cells is generally on at one time. After a predetermined interval, the "on" row is turned off and the next succeeding row of cells is turned on. In the case where the cells have hollow cathodes, the row-to-row switching which is required of a display has been more difficult to achieve than the row-to-row switching of planar cathodes.

According to this invention, the efficiency of a hollow cathode operating at low gas pressures and relatively high current levels is combined with the easy switching characteristics of a planar cathode. This desirable combination is achieved by using two separate structures for a cathode, a forward cathode element which is used for row-to-row scanning and which acts as a small source of electrons and a rear cathode element which acts as a relatively larger source of electrons. Together, they operate as a scannable hollow cathode capable of effecting an efficient high current density gas discharge at a low gas pressure. This concept will now be explained more fully with reference to FIG. 1 which illustrates, in schematic and simplified form, two rows of gas discharge cells, with certain elements which are not necessary for the explanation of the novel hollow cathode omitted.

Figure 1:
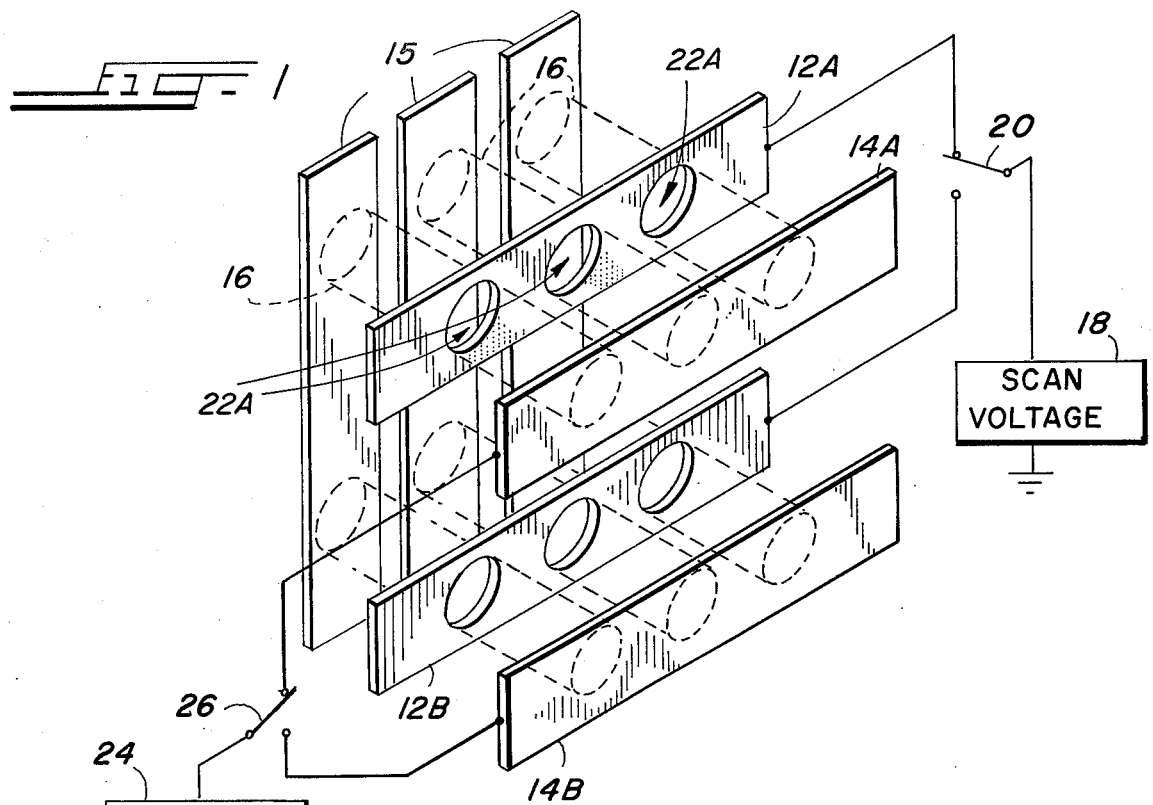
FIG. 1 depicts two rows of electrodes for a gas discharge display panel for illustrating one aspect of this invention.

Referring to FIG. 1 which is a rear view of a small matrix of cells, the first row of cells, row A, includes front cathode element 12A and rear cathode element 14A. As shown, there are three cells on row A, each of which communicates with one of three column-wise extending anodes 15.

The second row of cells, row B, includes front cathode element 12B and rear cathode element 14B. The cells of row B also communicate with anodes 15. Although no cell enclosures are depicted in FIG. 1 so that the explanation of this aspect of the invention can be simplified, it is assumed that a number of gas discharges can be maintained between the cathode elements and anodes 15. These discharges are also assumed to be confined to the areas indicated by dashed lines 16.

The operation of the FIG. 1 device is as follows. With a voltage source (not shown) connected to anodes 15 and a source 18 of scan voltage, −100V for example, connected to cathode element 12A through switch 20, a row of gas discharges may be set up between cathode element 12A and anodes 15. However, since cathode element 12A has a series of holes 22A at locations where each gas discharge is to occur, only a small area of front cathode element 12A is available for emitting electrons, thereby insuring that any discharges which exist between anodes 15 and front cathode element 12A will be of the low current variety.

When it is desirable to increase the current levels of the discharges in row A, a source 24 of a cathode control voltage is applied to cathode element 14A through switch 26. This preferably places cathode elements 12A and 14A at the same potential, i.e., −100V dc, and permits cathode element 14A to participate, along with cathode element 12A, in the generation of electrons for the gas discharges occurring in row A. With cathode element 12A positioned adjacent and essentially parallel to cathode element 14A, the adjacent surfaces of each cathode element "see" each other and, as a result, operate together as a row of hollow cathodes for generating a row of high current gas discharges.

When the high current gas discharges are no longer required of row A, switch 26 is actuated to remove the cathode control voltage from rear cathode element 14A, thus returning row A to a low current gas discharge condition. When it is desirable to switch the gas discharge from row A to row B, switch 20 is actuated to apply source 18 to front cathode element 12B. When this occurs, the discharges which exist in row A between anodes 15 and front cathode element 12A are transferred to row B. When it is desirable to go to a condition of high current level discharges in row B, switch 26 is actuated to apply the cathode control voltage to rear cathode element 14b. At this time, a hollow cathode effect is created between adjacent portions of cathode elements 12B and 14B, thereby increasing the current levels of the discharges in row B.

As pointed out above, when it is desirable to step the scan from one row to the next adjacent row, one need only step the cathode scan voltage from row-to-row. The cloud of electrons, ions and metastables which was present in the last "ON" row diffuses or is attracted by the electric field established by the cathode scan voltage in the next row, thereby causing the discharge to transfer to the next row.

This transfer of a discharge from one row to another by the row-by-row pulsing of the cathode will be referred to herein as "automatic scanning" to contrast it with gas discharge panels which must establish row-by-row discharges independently of discharges in adjacent "ON" rows. The external circuitry required for such automatic scanning is considerably simplified in comparison to other scanning methods.

In addition to providing an automatically scannable gas discharge display capable of effecting efficient, high current discharges at low gas pressures, a gas discharge display incorporating the above-described features of the FIG. 1 structure has the added advantage of being operable at relatively low voltages and at increased scanning speeds, as will now be demonstrated.

Referring again to FIG. 1, recall that a row of discharges was established between anodes 15 and the hollow cathode combination of elements 12A and 14A. This discharge may be considered as an auxiliary or scan discharge which is established for scanning from row-to-row in the manner described above and for priming a main or display discharge in a manner to be described. The display discharge will be an extension of the scan discharge and will be drawn beyond anodes 15 to a video anode which will control the intensity of the discharge in accordance with the information content of a video signal.

If the ribbon-like anodes 15 of FIG. 1 are replaced with thin-wire anodes, the scan discharge may be drawn past them into a display discharge area and toward a video anode. Such a structure is shown in FIG. 2 wherein cathode elements 12A, 12B, 14A and 14B correspond to like numbered elements of FIG. 1.

Figure 2:
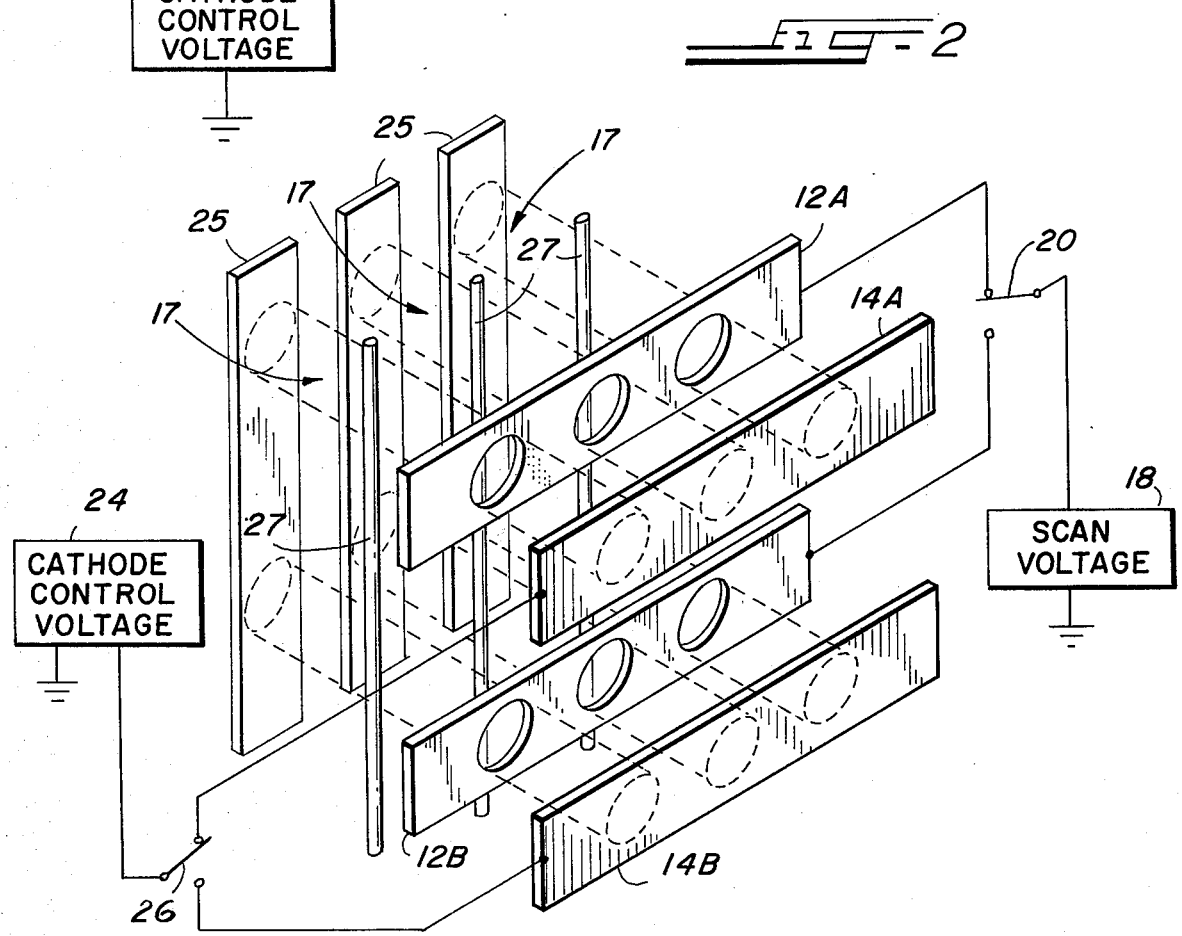
FIG. 2 depicts two rows and columns of electrodes for a gas discharge panel for illustrating another aspect of this invention.

In FIG. 2, scan anodes 27 replace ribbon anodes 15 of FIG. 1 and extend column-wise with one anode for each column of the array. Scan anodes 27 are small enough to permit the auxiliary or scan discharge which exists between them and the hollow cathode established between cathode elements 12A and 14A to be drawn past them into a main or display discharge area 17.

The display discharge area 17 is located between scan anodes 27 and video anodes 25 which extend column-wise with one video anode for each column of the array.

Assume that a scan discharge has been established in row A between each scan anode 27 and the hollow cathodes of row A. If a video signal (not shown) is applied to video anodes 25, the scan discharges of row A will be drawn beyond scan anodes 27 and up to each video anode 25. The amplitude of the video signals applied to the various video anodes 25 may vary in accordance with the information content of the video signal and thus vary the intensity of the discharges.

Because of the fact that with the FIG. 2 structure the scan discharge area (between scan electrodes 27 and cathode element 12A) is adjacent to the display discharge area 17, the electron cloud which exists in the scan discharge area can be drawn into the display discharge area 17 prior to the application of video signals to video anodes 25. This "electron injection" of the electron cloud into the display discharge area 17 will "prime" the display discharge area so that a display discharge can be established therein by the application of a video signal to video anodes 25 which is much smaller than would ordinarily create a discharge without priming. The way in which such priming is established will be shown below after a brief discussion of the advantages of electron injection priming.

As mentioned above, the priming available with the FIG. 2 structure considerably lowers the voltage required on the video anodes 25 to establish a display discharge. This is in contrast to some prior art structures wherein a scan discharge is generated between a scan anode located near the bottom of the panel and a cathode immediately above it. In such prior art structures, the display discharge area is located above the cathode and communicates with the scan discharge area through a small hole in a ribbon-like cathode element. The display discharge area of this prior art structure is primed by the diffusion of gas metastables through the hole in the cathode element and up into the display discharge area. A disadvantage of the diffusion priming of the display discharge area by gas metastables is that the voltages which must be applied to the video anodes is larger than that required for a structure in which the display discharge area is primed by electron injection. Another disadvantage of such priming is that the gas metastables have a relatively long lifetime in comparison to that of the electrons used in priming the display discharge area in accordance with this invention. As a result, the scanning rate of such a gas discharge panel is reduced by at least an order of magnitude over the scanning rate possible with electron injection priming.

In addition to being able to generate an efficient high current density gas discharge which is automatically scannable as described above, the FIG. 2 structure may be slightly modified in a manner to be described below to take advantage of the adjacency of the display and scan discharge areas to effect electron injection priming of the display discharge areas. This will achieve faster scanning rates than have been available in some prior art structures and will reduce the voltages required to be applied to the video anodes to generate the display discharge. Several novel improvements over the basic FIG. 2 structure will also be shown in the more complete embodiment now to be discussed.

A preferred embodiment of the novel scannable hollow cathode is shown in FIG. 3 in which certain dimensions have been exaggerated for clarity. The dimensions and materials of the FIG. 3 structure will be specified in the discussion to follow. As shown, the panel includes a center sheet 28 which has an array of rows and columns of bore-like cavities 30. Each cavity 30 is for enclosing a gas discharge and extends through center sheet 28 from front to back.

Sheet 32 has a like array of rows and columns of apertures 34. When sheet 32 is mated with center sheet 28, each aperture 34 is aligned with a particular cavity 30 as indicated by dashed lines 36. When so mated, apertures 34 and cavities 30 communicate as shown to form an array of cells terminating in "tub-like" recesses hereinafter called "display cavities." Referring to FIG. 3A, the bottom area of each recess has a phosphor coating 33 so as to emit light when excited by a gas discharge.

In place of the discrete rear cathode elements 14A and 14B of FIGS. 1 and 2, one continuous, substantially flat metal cathode sheet 37 is provided. Cathode sheet 37 communicates with each bore-like cavity 30 of the array and, along with a set of forward cathode elements to be subsequently described, forms rows of hollow cathodes.

The forward cathode elements 12A and 12B of FIGS. 1 and 2 take the form of pairs of cathode scanning wires 38, one pair for each row of bore-like cavities. Cathode scanning wires 38A communicate with row A, wires 38B with row B, etc. Each scanning wire pair runs parallel to cathode sheet 37 so that each wire pair and the portion of cathode sheet 37 adjacent thereto together operate as a row of hollow cathodes which may be scanned from row-to-row by the application of scanning signals to wires 38.

Situated within slots 40 in center sheet 28 is a set of column-wise extending scan anodes 42, one for each column of the array. In operation, scan anodes 42 receive a DC voltage to establish scan discharges between themselves and the pair of cathode scanning wires 38 which corresponds to the row of cells being scanned.

A set of column-wise extending video anodes 44 are situated within slots 46 in center sheet 28. Video anodes 44 are adapted to receive an information-bearing video signal for generating a gas discharge and a visible light output in a manner to be described hereinafter. Note that video anodes 44 are in communication with display cavities 35 through grooves 48.

Front sheet 50 is a transparent insulator which covers the entire front of the panel. It has a transparent conductive film 52 on the side opposite apertures 34 which acts as one plate of a capacitor in a manner to be described.

The operation of the FIG. 3 gas discharge panel is as follows. With each scan anode 42 returned to a source of DC voltage of +250 volts, for example, and with a scanning pulse of −100 volts applied to cathode scanning wire pair 38A, a row of discharges will be generated between each scan anode 42 and cathode scanning wire pair 38A. Thus, one entire row of cells will contain a low current discharge extending between elements 38A and 42.

The waveforms shown in FIG. 4 are illustrative of the signals applied to the various electrodes of the FIG. 3 panel. A typical TV video signal is also shown to illustrate the time correspondence between it and the other waveforms.

Waveform A is applied to cathode scanning wire pair 38A at $t_0$ to generate a series of discharged along row A. At this point, cathode sheet 37 is non-emitting and contributes nothing to the discharges existing in row A. At time $t_1$ waveform D drives cathode sheet 37 negative 100 volts, thereby permitting cathode sheet 37 to participate in the generation of electrons for row A. When this occurs, cathode scanning wire pair 38A and the portion of cathode sheet 37 adjacent thereto together form a hollow cathode which generates a high current gas discharge in each cell of row A.

At time $t_2$, as indicated by waveform E, an AC priming pulse of +350 volts is applied to conductive film 52 on front sheet 50. Since conductive film 52 is insulated from other elements of the panel by insulating front sheet 50, an effective capacitor is formed between conductive film 52 and cathode sheet 37. When the AC priming pulse E is applied to conductive film 52, a brief electric field is established throughout each cell of the array. In the case of the row A cells where a high current density scan discharge is taking place between cathode sheet 37 and scan anodes 42, the discharge is drawn toward conductive film 52 through bore-like cavities 30, into the display cavities 35. Since conductive film 52 completely covers each display cavity 35, the gas discharges in row A will spread uniformly throughout each display cavity in row A. The rush of electrons toward conductive film 52 tends to discharge the capacitor formed between conductive film 52 and cathode sheet 37 so that, left alone, the electron field and the gas discharges within display cavity 35 of row A would automatically decay. However, prior to the decay of the discharges in the display cavities of row A, a video signal, such as waveform F in FIG. 3, is applied to each video anode 44. The positive potential thus applied to video anodes 44 causes the gas discharges then present in display cavities 35 of row A to be pulled into grooves 48 of row A and sustains the capacitively induced discharges in accordance with the information content of the video signal. The capacitive priming action of conductive film 52 is disclosed and claimed in copending application Ser. No. 527,568, assigned to the assignee of this invention.

Once the video signal begins to control the display discharge, the priming pulse may be terminated. The width of the priming pulse is not critical since, as long as it is wide enough to insure that the video signal always begins during the presence of the priming pulse, the display discharge will be under the control of the video signal and the priming pulse can be terminated thereafter.

Note that the amplitude of the video signal required to continue or sustain the display discharge through the cavities is only approximately 250 volts, which is less than that required to initiate a discharge. The 250 volts which sustains the display discharge is in part a DC voltage and in part an AC signal voltage. If the video anodes are DC biased at a voltage less than the sustain voltage, say 150V, then it is only necessary that the AC signal voltage supplied by the video drivers have an amplitude of 100 volts. Video drivers capable of supplying a 100 volt AC signal voltage are capable of being fabricated in integrated circuit form. Therefore, a gas discharge panel constructed according to FIG. 3 avoids the expense associated with prior art panels requiring a discrete high voltage video driver for each video anode.

Although the priming pulse required to draw the discharge upward into cavities 30 is 350 volts, a higher voltage than integrated circuit drivers can normally handle, only one driver capable of handling such a large pulse is required for this panel since one front sheet 50 and conductive film 52 cover and prime all display cavities 35 of the panel simultaneously. This ability to prime each cell of the panel with a single high voltage driver, combined with the efficient priming of the discharge area by electron injection makes such gas discharge panels commercially feasible by permitting the use of relatively inexpensive integrated circuit video drivers.

Referring to FIG. 4, video signal F which is applied to a video anode 44 may vary the intensity of the gas discharge in a display cavity 35 and the resultant light output thereof by having a variable amplitude or by having a variable pulse width with a constant amplitude. In either case, the video signal terminates at a time $t_4$ which occurs while the forward and rear cathode elements 38 and 37 respectively of the FIG. 3 panel are still in the hollow cathode mode.

At the termination of the video signal, the discharge present between video anodes 44 and cathode sheet 37 collapses, reverting to a scanning discharge existing only between cathode sheet 37 and scan anodes 42.

At $t_5$, the cathode control pulse (waveform D of FIG. 4) goes positive and effectively removes cathode sheet 37 from participation in the generation of the discharge. With the cathode control pulse having a shorter duration than the scanning pulse (waveform B) and time positioned such that it is applied to cathode sheet 37 subsequent to the application of the scanning pulse to a pair of cathode scanning wires 38 and extinguished prior to the removal of the cathode scanning pulse from the scanning wires, no cell will have a high current gas discharge when the rows are being scanned. Instead, only a low current auxiliary or scan discharge will exist at that time to provide a condition for the cells in which the gas discharge is more easily transferred to an adjacent row.

Referring to FIG. 4 again, at $t_6$ the scanning pulse for row B of the panel goes negative 100 volts and transfers the scan discharge from row A to row B. Concurrently, the scanning pulse applied to row A goes positive.

At $t_7$, cathode sheet 37 is pulsed negative again as indicated in waveform D. This establishes a row of hollow cathodes in row B and generates a high current scan discharge between the hollow cathode of row B and each scanning anode 42. Shortly thereafter, a priming pulse (waveform E) is applied to conductive film 52 to draw the scan discharge up into the main discharge area and thus to prime each display cavity 35 in row B. A video signal is then applied to each video anode 44 to sustain the main discharge and control it in accordance with the information content of the video signal.

At $t_8$, when row B is to be extinguished, the scanning pulse applied to cathode scanning wire pair 38B of row B goes positive while the scanning pulse of the next adjacent row concurrently goes negative to transfer the discharge from row B to row C.

This method of scanning rows of a gas discharge panel by the transfer of the discharge to the next adjacent row can be applied to a panel having any number of rows. For example, in a panel having row $r_1$ to row $r_n$ and a corresponding number of pairs of scanning wires $w_1-w_n$, a repetitive set of negative going scanning pulses $p_1-p_n$ successively time space from one another as shown in FIG. 4 will cause the discharge to move from row $r_1$ to row $r_n$ in synchronism with scanning pulses $p_1-p_n$.

In the case of a panel having $n$ rows, one need not have $n$ distinct scanning pulses. If the rows are broken down into groups of perhaps seven rows per group, the same pulse applied to row 1 of group 1 may be applied to row 1 of group 2, row 1 of group 3, etc. In that way, corresponding rows of the different groups of rows will receive the same scanning pulse. These rows will not all have a gas discharge concurrently established within them since the discharge only travels to adjacent rows.

Referring again to the structure illustrated at FIG. 3, it is apparent that the panel shown therein is of greater simplicity than many prior art panels. For example, unitary center sheet 28 contains each recess and slot and thus does away with the need for matching up separate sheets or layers which must be in accurate registration with one another. Since center sheet 28 consists of nothing but holes, slots and grooves, no elaborate machining is required to reproduce it.

An additional advantage of the FIG. 3 structure is that it can be tiled; that is, one large panel can be made up of many discrete small center sheet 28 portions which fit together in a pattern or mosaic to form one larger panel Then, to insert the various wire electrodes such as scanning anodes 42, video anodes 44, or cathode scanning wires 38, each set of wires can be assembled on a harp-like jig with the wires spaced apart and held tautly in place. With the various small tiles assembled, the harp can be placed over the panel and the wires guided into place into their respective grooves. Fitting the wires into their proper grooves has the effect of aligning the tiles in their proper positions. Then, by fritting the harp into place with a glass frit, one may have what amounts to a reinforced, very sturdy and self-supporting structure. The fact that the assembled structure is self-supporting is an important advantage over many prior art panels which required additional layers merely for imparting rigidity to the completed structure. The panel can then be flipped over on its other side and the remaining wires can be laid in their appropriate grooves and fritted into place.

Since cathode sheet 37 is one large, unitary element there is no problem of registering it with the bottom side of the panel. Likewise, front sheet 32 may be one large piece which need only be laid over center sheet 28 and brought into proper registration. Finally, front sheet 50 is laid over the entire front of the panel and joined thereto, thus completing the assembly of the panel, with the exception of top and bottom glass covering plates which may sandwich the completed structure. When it is desirable to make use of the tiling concept, it is preferred that the tiles which constitute the perimeter of the panel not have cells along their outer edges. This will avoid the problem of sealant contaminating cells which are near the edges of the panel. The perimeter tiles should, however, include the slots and grooves for the various sets of wire conductors.

The FIG. 3 structure is shown as having bore-like cavities 30 which run from the front of center sheet 28 through to the back of it. With this structure a viewer may possibly be able to see part of the cathode glow which exists at the bottom of each cavity. Although the amount of light which escapes through to the front of the panel is small, it could reduce the overall contrast ratio. Therefore, bore-like cavities 30 may be slanted so that a viewer looking at the panel from the front would be unable to see any part of the cathode glow.

Bore-like cavities 30, shown as being generally circular in FIG. 3, may also be rectangular. In that case, the rectangular "cavities" will have a lengthwise dimension extending from the front to the back of center sheet 28 and a lateral dimension which is preferably equal to the width of apertures 34. The "height" of such rectangular "cavities" should be the smallest cavity dimension, thereby giving the "cavity" a "flat" appearance. The theory behind the flat cavity is explained in detail in copending U.S. Pat. No. 3,899,636 issued to the assignee of this invention.

An additional advantage of the FIG. 3 structure is that the video voltages which are applied to the video anodes 44 are relatively low, lower than the breakdown voltage of the gas itself. Since there is no video voltage present between adjacent video anodes that is higher than the sustaining voltage of the gas, the problem of cross-firing, leakages and back-fires that may occur in gas plasma tubes disappears.

As pointed out above, the scannable hollow cathode structure of FIG. 3 permits the generation of efficient high current density gas discharges at low gas pressures. Such reduced gas pressures permit higher electron temperatures to exist, thereby making the whole panel even more efficient and enabling the panel to run at a lower power consumption.

Specifically, the pressures and gases found suitable for the FIG. 3 structure are helium at a pressure of 100 torr and mercury at a pressure of 0.08 torr. At these pressures, highly efficient gas discharges are generated, as explained in detail in the aforesaid U.S. Pat. No. 3,899,636.

The preferred dimensions and materials for constructing the embodiment of this invention shown in FIG. 3 will now be given. Referring to FIG. 3, front sheet 50 is a piece of glass having a thickness on the order of 4–6 mils with a transparent conductive film of tin oxide disposed thereon.

The next layer in the FIG. 3 structure is display-cavity forming sheet 32 which is preferably made of mica with a thickness of approximately 4 mils. The major axis (length) of each aperture 34 is sheet 32 is 38 mils while the minor axis (width) is 10 mils. The center to center spacing of apertures 34 in the row-wise direction is 20 mils and the center to center spacing in the column-wise direction is 43 mils. Mica is preferred for this sheet since it is easy to punch-form apertures 34 therein so as to produce nicely formed holes. Another alternative for sheet 32 is that it be thin glass with an array of apertures that are etched in a manner well known in the art.

Center sheet 28 is preferably made of a machinable glass ceramic or soda lime glass. However, whatever is used for center sheet 28 must have a co-efficient of expansion which is compatible with the other elements of the structure so that when the various layers are sealed together in a package the integrity of the seal will not be impaired.

The front-to-back length of center sheet 28 is preferably about 75 mils. Bore-like cavities 30 have a diameter of from 10–15 mils.

Wires 44 which constitute the video anode conductors and wires 38 which constitute the cathode scanning wires and wires 42 which constitute the scan anode conductors are all 5 mils in diameter.

Column-wise extending slots 46 are 6 mils wide and from 6 to 7 mils deep. Grooves 48 which communicate with slots 46 are typically about 10 mils deep, just deep enough to place video anodes 44 somewhat beneath the bottom surface of the display cavities 35.

Slots 40 near the rear of center sheet 28 are in the order of 15 mils wide and 40 mils deep. Scan anodes 42 are inserted all the way into slots 40 as shown in FIG. 3.

The row-wise extending slots 39 which hold cathode scanning wires 38 are approximately 6 mils wide and about 15 mils deep. Cathode scanning wires 38 are inserted all the way into their respective slots so that there is a gap between them and cathode sheet 37. The center to center spacing between the wires of any pair of wires in a row is approximately 25 mils. The center to center spacing beteen adjacent pairs of wires is 43 mils. The 43 mil spacing between one row and another is appropriate for a 35 inch diagonal flat panel televison display.

The final layer of the FIG. 3 structure is cathode sheet 37 which is preferably about 3 mils thick and made of a metal commonly known as Alloy Number 4, available from Sylvania Electric Products, Inc., Warran, Pennsylvania.

When the FIG. 3 structure is fully assembled, it may include a top glass covering plate and a bottom glass plate between which the layers shown in FIG. 3 are sandwiched. The entire structure may then be sealed together with pyroceram (trademark of Corning Glass Works) or any other suitable sealant. Transparent conductive film 52 may be deposited on the underside of the front glass covering plate rather than on top of front sheet 50. In either case, transparent conductive film 52 will be sandwiched between front sheet 50 and the top glass covering plate.

A system for displaying television images on the type of panel shown in FIG. 3 is illustrated in block diagram form in FIG. 5. The individual elements which drive the gas discharge panel are generally well known in the art.

Television receiver 56 provides the system with a source of a video signal, a horizontal sync signal and a vertical sync signal. The video signal is applied to sample and hold circuits 58 which sample the video signal once each horizontal line time in synchronization with the horizontal sync signal.

Linear gates 60 receive the horizontal sync signal from television receiver 56 and, when triggered by the horizontal sync signal, apply the sampled video signal stored in network 58 to individual hold circuits 62, one for each column of cells. Each hold circuit is coupled to a corresponding video anode driver for driving video anodes 44 of the FIG. 3 panel.

Panel 66 is constructed according to FIG. 3 and consists, for example, of a 490 by 1400 array of cells.

Cathode scanning wires 64 are driven by seven phase cathode drivers 67. Driver $\phi_1$ drives cathode scanning wires 1, 8, 15, etc. while the cathode driver $\phi_2$ drives cathode scanning wires 2, 9, 16, etc.

Shift register 68 receives a vertical sync signal from televison receiver 56 and drives seven phase cathode drivers 67 to cause successive rows of panel 66 to be scanned in synchronism with the vertical sync signal.

Priming pulser 70 receives the horizontal sync signal for developing the priming pulse (waveform E of FIG. 4) which is applied to the conductive film 52 on front sheet 50 (FIG. 3).

Cathode sheet pulser 72 also receives the horizontal sync signal for generating a cathode control pulse (waveform D of FIG. 4) which is applied to cathode sheet 37 (FIG. 3).

Panel 66 oprates in the same manner as described above for the FIG. 3 panel. The other blocks of the FIG. 5 system may be of conventional design and operate in a manner well known in the art.

While this invention has been described with specific embodiments thereof, it is evident that many alterations, modifications, and variations will be apparent to those skilled in the art in light of the above disclosure. This is particularly true of the novel scannable hollow cathode disclosed herein. Such a cathode may be constructed in various ways, one of which has been specifically described with reference to FIG. 3. Alternate but less desirable embodiments of the forward cathode means include a ribbon-like conductor having apertures through which the discharge can be drawn or a single wire conductor instead of the wire pairs shown in FIG. 3. Accordingly, the broader concepts disclosed herein relative to the scannable hollow cathode and panel structure are intended to embrace the different embodiments, alterations and variations which fall within the scope of this invention as defined by the appended claims.

What is claimed is:

1. In a gas discharge panel having an array of rows and columns of gas discharge cells which emit light when a discharge is created in a gas atmosphere between a forwardly located anode; that is, an anode lying toward the front panel display and a rearwardly mounted cathode structure, the improvement wherein said cathode is a scannable hollow cathode structure made up of two electrically isolated parts comprising:
   a set of row-wise extending, electrically conductive, rear cathode means, one for each row of cells, and with each row of the series communicating with every cell in its respective row of cells; and
   a corresponding set of electrically conductive, row-wise extending forward cathode means, one for each rear cathode means, each forward cathode means being positioned adjacent and essentially parallel to its respective rear cathode means and situated between said rear cathode means and the anode such that all pairs of the rear and forward cathode means together operate as hollow cathodes which may be scanned row by row by the application of scanning signals thereto.

2. A scannable hollow cathode structure as set forth in claim 1 including means for applying scanning pulses to the forward cathode means for periodically energizing successive ones of the forward cathode means so as to scan the array row by row; and
   means for applying, in synchronism with said scanning pulses, a periodically occurring control pulse to the set of rear cathode means so as to establish, in cooperation with the energized forward cathode means, a row-wise series of hollow cathodes.

3. A scannable hollow cathode as set forth in claim 2 wherein one control pulse is applied to the rear cathode means for every scanning pulse applied to the forward cathode means, and wherein a control pulse is of lesser duration than a scanning pulse and time positioned such that a control pulse is applied to the rear cathode means subsequent to the application of a scanning pulse to a particular forward cathode means and the control pulse is removed from the rear cathode means prior to the removal of the scanning pulse from said particular forward cathode means.

4. A cathode structure as set forth in claim 1, wherein said set of rear cathode means comprises one continuous, substantially flat cathode sheet which communicates with each cell of the array.

5. A cathode structure as set forth in claim 4 wherein said forward cathode means comprises pairs of electrically connected, substantially parallel wires running for the entire length of every row of cells and communicating with each cell in the row.

6. In an automatically scanning, high efficiency, gas discharge display device, the combination comprising:
   an array of row and columns of gas discharge cells;
   a flat metal cathode sheet located at the back of the array and positioned to communicate with each cell in the array; ad
   a plurality of pairs of cathode scanning wires, one pair for each row of cells of the array, running parallel to the cathode sheet and situated between the cathode sheet and the array such that each scanning wire pair communicates with one row of cells and each scanning pair and the portion of the cathode sheet adjacent thereto together operate as a row of hollow cathodes, which hollow cathodes may be scanned from row to row by the application of scanning signals to said cathode scanning wires.

7. A gas discharge display device as set forth in claim 6 including:
   a signal source for generating a periodic negative-going voltage pulse whose duration is equal to the desired ON time of a row and means for applying said pulse to the cathode sheet; and
   a scanning signal source for generating a repetitive set of negative-going scanning pulses $P_1-P_N$ successively time-spaced from one another, and means for applying said scanning pulses to corresponding pairs of cathode scanning wires $W_1-W_N$ associated with rows $R_1-R_N$ for causing a discharge to occur at each cell in a particular row of cells and for causing said discharge to move from row $R_1$ to row $R_N$ in synchronism with cathode scanning pulses $P_1-P_N$.

8. A gas discharge display device having a matrix of rows and columns of light emitting, gas-filled discharge cells, comprising:
   a center sheet having an array of rows and columns of bore-like cavities in which gas discharges are selectively established; and
   a set of electrodes disposed in the following order from back to front of said center sheet;
   cathode means near the back of said center sheet;
   scan anode means for receiving a scan voltage to establish scan discharges between said cathode means and said scan anode means; and
   video anode means near the front of the center sheet for receiving an information-bearing signal and for maintaining display discharges in selected cavities;
   said cathode means being characterized by a set of row-wise extending, electrically conductive, rear cathode means, one for each row of cavities, and each communicating with every cavity in its respective row of cavities; and a corresponding set of electrically conductive, row-wise extending forward cathode means, one for each rear cathode means, each forward cathode means being positioned adjacent and essentially parallel to its respective rear cathode means and situated between said rear cathode means and said scan anode means such that all pairs of rear and forward cathode means together operate as hollow cathodes which may be scanned row-by-row by the application of scanning signals thereto.

9. A gas discharge display device as set forth in claim 8 wherein said set of rear cathode means comprises one continuous, substantially flat metal cathode sheet which communicates with each cavity of the array.

10. A gas discharge display device as set forth in claim 9 wherein said set of forward cathode means comprises a plurality of pairs of cathode scanning wires, one pair for each row of bore-like cavities, running parallel to the cathode sheet and situated between the cathode sheet and the scan anode means such that each scanning wire pair communicates with one row of bore-like cavities and each scanning wire pair and the portion of the cathode sheet adjacent thereto together operate as a row of hollow cathodes which may be scanned from row to row by the application of scanning signals to said cathode scanning wires.

11. A gas discharge display device as set forth in claim 10 including means for applying scanning pulses to said cathode scanning wires for periodically energizing successive pairs of said wires so as to scan the array row-by-row; and
means for applying, in synchronization with said scanning pulses, a periodically occurring energizing pulse to said cathode sheet so as to establish, in cooperation with the energized pair of cathode scanning wires, a row of hollow cathodes.

12. A gas discharge display device having a matrix of rows and columns of light emitting gas filled discharge cells comprising:
a center sheet having an array of rows and columns of bore-like cavities for enclosing gas discharges therein, each of said cavities extending through the sheet from front to back;
means defining an array of rows and columns of display cavities located at the front of said center sheet, each display cavity having a phosphor coating therein and being situated so as to be aligned with and communicating with a particular one of said bore-like cavities, each bore-like cavity and its associated display cavity comprising one cell of the array;
a set of column-wise extending video anodes, one for each column of the array, situated near the front of said center sheet so as to communicate with each display cavity in a column of said display cavities;
a set of row-wise extending, electrically conductive rear cathode means situated near the back of said center sheet, one for each row of cells, and each communicating with each cell in its respective row of cells;
a corresponding set of electrically conductive, row-wise extending forward cathode means, one for each rear cathode means, each forward cathode means, being positioned adjacent and essentially parallel to its respective rear cathode means and situated between said rear cathode means and said video anode such that all pairs of rear and forward cathode means together operate as hollow cathodes which may be scanned row-by-row by the application of scanning signals thereto; and
a set of column-wise extending scan anodes, one for each column of the array, situated in the center sheet between said video anodes and said forward cathode means for receiving a scan voltage to establish scan discharges between themselves and selected forward cathode means.

13. A display device as set forth in claim 12 which further comprises a priming capacitor having electrodes near opposite ends of the cells, said capacitor adapted to receive a priming voltage for generating a brief electric field substantially throughout the length of each bore-like cavity in a selected row of bore-like cavities for establishing an automatically decaying priming discharge throughout the lengths thereof so as to permit the continuation of the discharge through the bore-like cavities and their associated display cavities having a phosphor coating by a video signal voltage applied to the video anodes which is less than that required to initiate a discharge.

14. A display device as set forth in claim 13 which further comprises means for applying to said priming capacitor a periodic priming pulse of predetermined duration for establishing periodic priming discharges in a selected row of cells, and wherein the video signal which is applied to said video anodes begins during the presence of a priming pulse and modulates the discharge in accordance with the information contained in the video signal.

15. A gas discharge display device having a matrix of rows and columns of light emitting gas filled discharge cells comprising:
a center sheet having an array of rows and columns of bore-like cavities for enclosing gas discharges therein, each of said cavities extending through the sheet from front to back;
means defining an array of rows and columns of display cavities having phosphor coatings located at the front of said center sheet, each display cavity situated so as to be aligned with and communicating with a particular one of said bore-like cavities, each bore-like cavity and its associated display cavity comprising one cell of the array;
cathode means disposed near the back of said center sheet;
a priming capacitor having electrodes near opposite ends of the cells, said capacitor adapted to receive a priming voltage for generating a brief, automatically decaying electric field in a selected row of bore-like cavities and display cavities so as to establish an automatically decaying gas discharge therein; and
video anode means disposed near the front of said sheet and communicating with said display cavities for receiving an information-containing electrical signal for sustaining the capacitively induced discharge in said row of said display cavities in accordance with the information contained in the electrical signal received by the video anode means.

16. A gas discharge device as set forth in claim 15 wherein said priming capacitor includes said cathode means and a front electrode located near the front of said center sheet, said front electrode receiving a priming pulse for establishing the electric field in a selected row of cells between said electrode and said cathode means.

17. A gas discharge display device as set forth in claim 16 wherein said front electrode comprises a transparent insulator sheet disposed near the front of the center sheet and overlying all recesses, said insulator sheet having a transparent conductive film on a side thereof opposite the recesses to act as one plate of a capacitor.

18. A gas discharge display device having a matrix of rows and columns of light emitting gas filled discharge cells comprising:
- a center sheet having an array of rows and columns of bore-like cavities for receiving gas discharges therein, each of said bore-like cavities extending through the sheet from front to back;
- a set of row-wise extending, electrically conductive rear cathode means situated near the back of said center sheet, one for each row of bore-like cavities, and each communicating with each cavity in its respective row of cavities;
- a corresponding set of electrically conductive, row-wise extending forward cathode means, one for each rear cathode means, each forward cathode means being positioned adjacent and essentially parallel to its respective rear cathode means and situated between said rear cathode means and the front of said center sheet such that all pairs of rear and forward cathode means together operate as hollow cathodes which may be scanned row-by-row by the application of scanning signals thereto;
- means for applying a scanning signal to the forward cathode means for periodically energizing successive rows of the forward cathode means so as to scan the array row-by-row;
- a priming capacitor having electrodes near opposite ends of the bore-like cavities, said capacitor being adapted to receive a priming voltage for generating a brief, automatically decaying electric field in the row of bore-like cavities having an energized hollow cathode so as to establish an automatically decaying gas discharge in the energized row of cavities; and
- video anode means disposed near the front of said sheet and communicating with said bore-like cavities, said anode means being adapted to receive an information-containing electrical signal for sustaining the capacitively induced discharge in said energized row of bore-like cavities in accordance with the information contained in the electrical signal received by the video anode means.

19. A display device as set forth in claim 18 including a set of column-wise extending scan anodes, one for each column of the array, situated in the center sheet between said video anode means and said forward cathode means for receiving a scan voltage to establish scan discharges between said scan anode and said forward cathode means.

20. A gas discharge display device as set forth in claim 19 wherein said priming capacitor includes said rear cathode means and a forward electrode located near the front of said center sheet.

21. A gas discharge display device as set forth in claim 20 wherein said forward electrode comprises a transparent insulator sheet disposed near the front of the center sheet and overlying all cavities, said insulator sheet having a transparent conductive film on a side thereof opposite the cavities to act as one plate of a capacitor.

22. A gas discharge display device as set forth in claim 18 wherein said set of rear cathode means comprises one continuous, substantially flat metal cathode sheet which communicates with each bore-like cavity of the array, and wherein said set of forward cathode means comprises a plurality of pairs of cathode scanning wires, one pair for each row of bore-like cavities, running parallel to the cathode sheet, each scanning wire pair communicating with one row of bore-like cavities and each scanning wire pair and the portion of the cathode sheet adjacent thereto together operating as a row of hollow cathodes which may be scanned from row to row by the application of scanning signals to said cathode scanning wires.

23. A gas discharge display device having a matrix of rows and columns of light emitting gas filled discharge cells comprising:
- a center sheet having an array of rows and columns of bore-like cavities for receiving gas discharges therein, each of said cavities extending through the sheet from front to back;
- means defining an array of rows and columns of display cavities having a phosphor coating located at the front of said center sheet communicating with a particular one of said bore-like cavities, each bore-like cavity and its associated display cavity comprising one cell of the array;
- a set of row-wise extending, electrically conductive rear cathode means situated near the back of said center sheet, one for each row of cells, and each communicating with each cell in its respective row of cells;
- a corresponding set of electrically conductive, row-wise extending forward cathode means, one for each rear cathode means, each forward cathode means being positioned adjacent and essentially parallel to its respective rear cathode means and situated between said rear cathode means and said video anode such that all pairs of rear and forward cathode means together operate as hollow cathodes which may be scanned row-by-row by the application of scanning signals thereto;
- means for applying a scanning signal to the forward cathode means for periodically energizing successive rows of the forward cathode means so as to scan the array row-by-row;
- a priming capacitor having electrodes near opposite ends of bore-like cavities, said capacitor adapted to receive a priming voltage for generating a brief, high energy, automatically decaying electric field in the row of bore-like cavities having an energized hollow cathode so as to establish an automatically decaying gas discharge in the energized row of bore-like cavities; and
- video anode means disposed near the front of said sheet and communicating with the bore-like cavities, said anode means being adapted to receive an information-containing electrical signal for sustaining the capacitively induced discharge in said energized row of bore-like cavities in accordance with the information contained in the electrical signal received by the video anode means.

24. A gas discharge display device as set forth in claim 23 including a set of column-wise extending scan anodes, one for each column of the array, situated between the front of said counter sheet and said forward cathode means for receiving a scan voltage to establish scan discharges between said scan anodes and said forward cathode means.

25. A gas discharge display device as set forth in claim 24 wherein said set of rear cathode means comprises one continuous, substantially flat metal cathode sheet which communicates with each cell of the array.

26. A gas discharge display device as set forth in claim 25 wherein each of said forward cathode means comprises a pair of electrically connected, substantially parallel wires running for the entire length of a row of cells and communicating with each cell in the row.

27. A gas discharge display device as set forth in claim 25 wherein one electrode of said priming capacitor includes said flat metal cathode sheet and the other electrode is located near the front of said center sheet and is adapted to receive a priming pulse for establishing the electric field in a selected row of cavities.

28. A gas discharge display device as set forth in claim 27 wherein said other electrode comprises a transparent insulator sheet disposed near the front of the center sheet and overlying all display cavities, said insulator sheet having a transparent conductive film on a side thereof opposite the display cavities to act as one plate of a capacitor.

29. A gas discharge display device having a matrix of rows and columns of light emitting gas filled discharge cells comprising:
- a center sheet having an array of rows and columns of bore-like cavities for receiving gas discharges therein, each of said cavities extending through the sheet from front to back;
- means defining an array of rows and columns of display cavities having phosphor coatings located at the front of said center sheet, each display cavity situated so as to be aligned with and communicating with a particular one of said bore-like cavities, each bore-like cavity and its associated display cavity comprising one cell of the array;
- a flat, metal cathode sheet situated near the back of said center sheet and communicating with each cell of the array;
- a plurality of pairs of cathode scanning wires, one pair for each row of the array, running parallel to the cathode sheet and situated between the cathode sheet and the front of the center sheet such that each scanning wire pair communicates with one row of cells and each scanning wire pair and a portion of the cathode sheet adjacent thereto together operate as a row of hollow cathodes which may be scanned from row to row by the application of scanning signals to said cathode scanning wires;
- a set of column-wise extending scan anodes, one for each column of the array, situated in the center sheet between said cathode scanning wires and the front of said center sheet for receiving a scan voltage to establish scan discharges between themselves and selected cathode scanning wires;
- a transparent insulator sheet disposed near the front of the center sheet and overlying all display cavities said insulator sheet having a transparent conductive film on a side thereof opposite the cavities to act as one plate of a capacitor and adapted to receive a voltage pulse for establishing an automatically decaying electric field between itself and said flat cathode sheet for generating a row of automatically decaying display discharges in the row of cells in which the scan discharges exist; and
- a set of column-wise extending video anodes disposed between said cathode scanning wires and the front of said center sheet and communicating with each display cavities in a row, said anodes adapted to receive an information-containing electrical signal for sustaining the capacitively induced display discharges in accordance with the information contained in the electrical signal received by said video anodes.

* * * * *